United States Patent [19]

Shimizu et al.

[11] Patent Number: 5,113,077
[45] Date of Patent: May 12, 1992

[54] RADIATION DETECTION CIRCUIT HAVING A SIGNAL INTEGRATING CAPACITOR, AND A DATA AQUISITION SYSTEM FOR AN X-RAY SCANNER INCLUDING SUCH CIRCUIT

[75] Inventors: Toshihiko Shimizu, Hachioji; Masao Hotta, Hanno; Atsushi Moritani, Yokohama, all of Japan

[73] Assignee: Hitachi Medical Corporation, Chiyoda, Japan

[21] Appl. No.: 588,718

[22] Filed: Sep. 27, 1990

[30] Foreign Application Priority Data

Oct. 5, 1989 [JP] Japan ............................ 1-261017

[51] Int. Cl.⁵ ............................................ G01T 1/24
[52] U.S. Cl. ............................ 250/370.11; 307/491
[58] Field of Search ............... 250/370.11; 307/491, 307/270, 362; 378/91

[56] References Cited

U.S. PATENT DOCUMENTS

| | | | |
|---|---|---|---|
| 4,153,839 | 5/1979 | Hounsfield | 250/370.11 |
| 4,278,889 | 7/1981 | Erker | 378/19 |
| 4,910,455 | 3/1990 | Nadd | 307/362 |

Primary Examiner—Carolyn E. Fields
Assistant Examiner—James E. Beyer
Attorney, Agent, or Firm—Antonelli, Terry, Stout & Kraus

[57] ABSTRACT

A radiation detection circuit integrates output currents of a plurality of X-ray CT scanner radiation detectors, which are combinations of scintillators and photodiodes, during a short period to convert them to charge information in order to collect data for reproducing a tomogram. A current amplifier is connected to the output terminal of the photo-diode, and an output current of the current amplifier is charged in an integration capacitor. In this manner, the radiation detection circuit enables reduction of the measurement period.

14 Claims, 6 Drawing Sheets

000
RADIATION DETECTION CIRCUIT HAVING A SIGNAL INTEGRATING CAPACITOR, AND A DATA AQUISITION SYSTEM FOR AN X-RAY SCANNER INCLUDING SUCH CIRCUIT

BACKGROUND OF THE INVENTION

The present invention relates to a radiation detection circuit for an X-ray CT scanner and a data acquisition system for acquiring detection results from a plurality of such radiation detection circuits.

In an X-ray CT scanner, a fan X-ray beam radiated from an X-ray tube and shaped by a collimator passes through an object set in a photographing area and is detected by a plurality of X-ray detectors arranged to face the X-ray tube.

Output currents of the respective detectors are integrated as charge information during a short period of measurement. The measurement is repeated while the positions of the X-ray tube and the detector array are rotated around the object a small angle at a time. Parallel data of the respective measurements is projection data of slices of the object at the respective angles. A plurality of projection data are sequentially obtained. Such parallel data are collected by the data acquisition system for each measurement, and the collected data are sequentially digitized by an A/D converter, analyzed by a computer and image-reconstructed to produce an X-ray tomogram of the object.

JP-A-61-263441 shows a prior art data acquisition system. In this system, as shown in FIG. 9, a current output from an X-ray detector (Xe chamber) is utilized without loss so that the current output from the X-ray detector is integrated as charge during a period of measurement, which is then converted to a voltage.

In FIG. 9, numeral 7-i denotes an integrator which is made up of switches S1i, S2i and S3i and an integration capacitor Csi. As many such integrators as the number of X-ray detectors are provided. Numeral 8 denotes a charge/voltage converter which is made up of an operational amplifier OP1, switches SW4 and SW7, a hold capacitor $C_H$ and an offset compensation circuit 9. In the charge/voltage converter, the switches S1i and S3i are opened and the switch S2i is closed to integrate the current output of the detector in the integration capacitor Csi during the measurement period. Then, the switch S1i is closed and the switch S2i is opened. Then, the switches S3i of the respective integration circuits are sequentially closed and opened to transfer the charges of the integration capacitors Csi to the hold capacitor $C_H$ to convert the charge to a voltage.

In the prior art, where the current output of the X-ray detector is $I_i$ and one measurement period is t, an output voltage V generated in the integration capacitor Csi assumes a maximum value $V_{max}$ when $I_i$ is maximum $$V_{max} = (I_i \cdot t)/C \quad (1)$$

where C is a capacitance of the integration capacitor Csi.

SUMMARY OF THE INVENTION

As the operating speed of the X-ray CT scanner increases, one measurement period t is shortened and $V_{max}$ is reduced. Since $V_{max}$ affects the precision of the data, maximum amplitude must be maintained. To this end, either the maximum value $I_{imax}$ of the current output $I_i$ of the X-ray detector is to be increased, or the capacitance C of the integration capacitor Csi is to be decreased.

However, it is difficult to increase $I_{imax}$ because it is restricted by the performance of the detector. On the other hand, since the capacitance C is affected by charge feed-through by a stray capacitance $C_{SW}$ of the switch connected to the integrator capacitor Csi, the decrease of the capacitance C will enhance the above precision.

Accordingly, $V_{max}$ decreases with the decrease of the measurement period t and a dynamic range of the output voltage of the integrator capacitor decreases. As a result, the precision of the projection data decreases.

Where a conventional solid state detector which is made up of a scintillator and a photo-diode is used as the X-ray detector, the current output of the photo-diode becomes non-linear due to the change of bias voltage.

Where the detector of this type is applied to the prior art data acquisition system, the integration circuit is directly connected to the photo-diode. As a result, if the charge voltage of the integration capacitor varies with the current output of the photo-diode in the detector, the biasing voltage of the photo-diode changes. This causes the detector output to be non-linear.

It is an object of the present invention to provide a radiation detection circuit which produces an output voltage with a high precision and a large signal dynamic range in spite of the reduction of a period of one measurement.

It is another object of the present invention to provide a radiation detection circuit which does not cause change of biasing voltage of a photo-diode and can maintain the linearity of an output voltage.

It is still another object of the present invention to provide a data acquisition system which can collect output data of multi-channel radiation detectors with a high speed and a high precision.

It is a further object of the present invention to provide an X-ray CT scanner which can provide a high precision X-ray tomogram in spite of reduction of the measurement period.

One feature of the present invention resides in a radiation detection circuit which is comprised of a radiation detector having first conversion means for converting a radiation signal to a light signal and second conversion means for photo-electrically converting the light signal of the first conversion means, a current amplifier for amplifying the current output provided at a current output terminal of the radiation detector, and an integrator for integrating the output of the current amplifier.

Another feature of the present invention resides in a data acquisition system which is comprised of a plurality of radiation detection circuits each having the current amplifier and the integrator, means for sequentially selecting the charge outputs of the integrators, and means for sequentially converting the charge outputs sequentially outputted by the selection means to voltages.

In the radiation detection circuit of the present invention, in order to reduce the data acquisition period t, a current amplifier is provided to amplify an output signal current $I_i$ of the X-ray detector to secure a dynamic range of an integrator output V (see formula (1)). As a result, the capacitance of the integration capacitor need not be reduced, and the increase of charge feed-through due to the switching element of the integrator is not caused.

The current amplifier is made up of an operational amplifier, a feedback resistor, an amplifying resistor and a common-base transistor so that an input terminal of the current amplifier is always virtually at a constant bias level such as a power supply voltage or ground. As a result, the output terminal of the detector is fixedly biased, and the dependency to the bias voltage of the photo-diode at the output terminal can be neglected, and linearity of the photo-diode is assured. Further, a problem of breakdown of the photo-diode which may occur when the output current of the detector increases is avoided.

In accordance with the data acquisition system which uses the radiation detection circuit described above and the X-ray CT scanner which reconstructs a tomogram of an object based on the data from the data acquisition system, a high quality tomogram is obtained based on radiation detection data collected at a high speed and a high precision.

DESCRIPTION OF THE PREFERRED EMBODIMENTS

Figure 1:
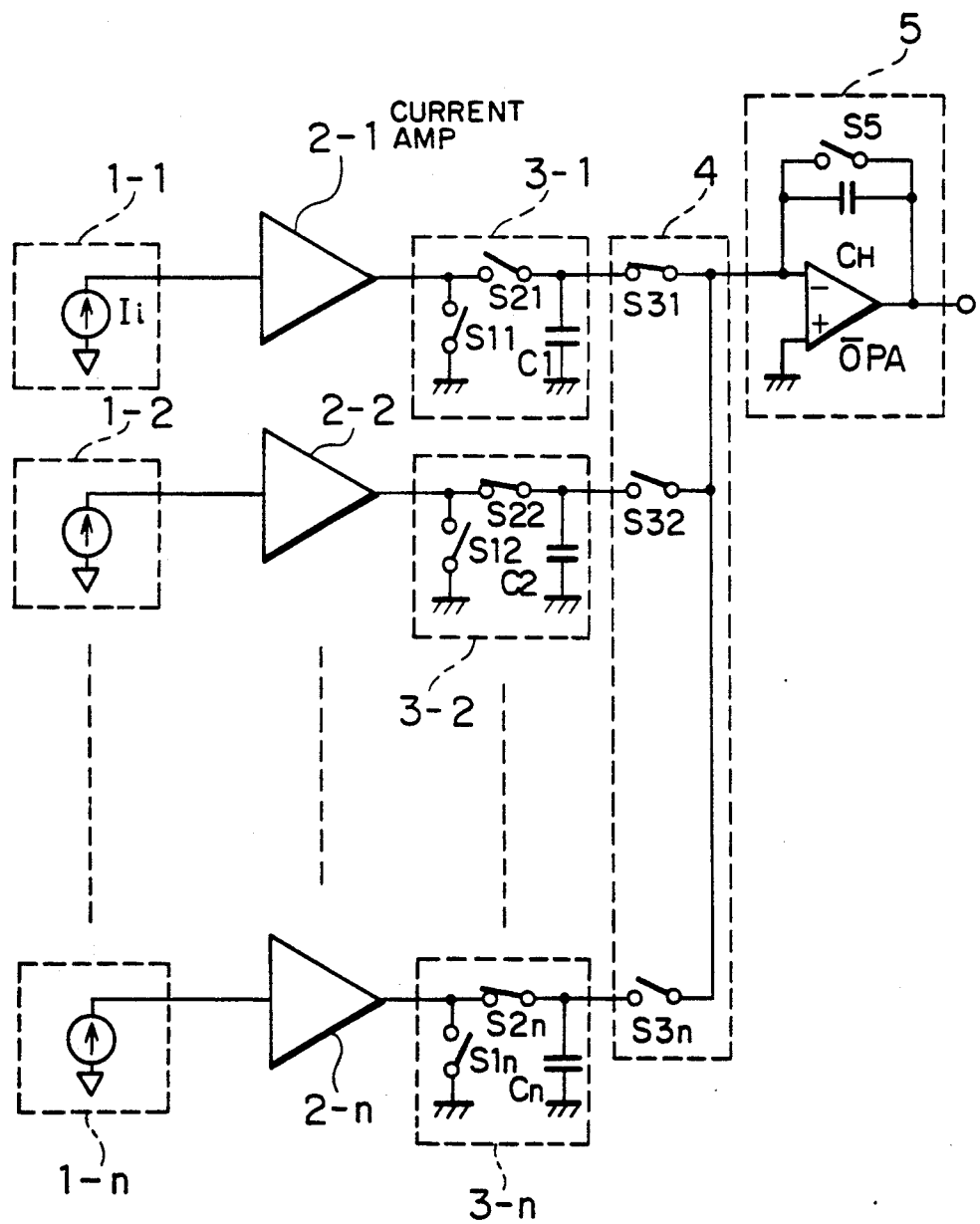
FIG. 1 shows a configuration of one embodiment of a data acquisition system of the present invention.

FIG. 1 shows a configuration of one embodiment of a data acquisition system of the present invention. Numerals 1-1 to 1-n denote multi-channel X-ray detectors arranged to face an X-ray tube, numerals 2-1 to 2-n denote current amplifiers corresponding to the multi-channel X-ray detectors 1-1 to 1-n, numerals 3-1 to 3-n denote integrators corresponding to the multi-channel X-ray detectors 1-1 to 1-n, numeral 4 denote a multiplexer and numeral 5 denotes a charge/voltage converter.

Each of the integrators 3-1 to 3-n is made up of a switch S1n connected between an input terminal and ground, a switch S2n connected between the input terminal and an output terminal, and a capacitor Cn connected between the output terminal and the ground. The multiplexer 4 is made up of n switches S31 to S3n each having one terminal thereof connected to the output terminal of the corresponding integrator and the other terminal connected in common. The charge/voltage converter 5 is made up of an operational amplifier having an inverting input terminal thereof connected as an input terminal, an output terminal thereof connected as an output terminal, and a non-inverting input terminal thereof grounded, and a capacitor $C_H$ and a switch S5 connected in parallel between the inverting input terminal and the output terminal.

Figure 2:
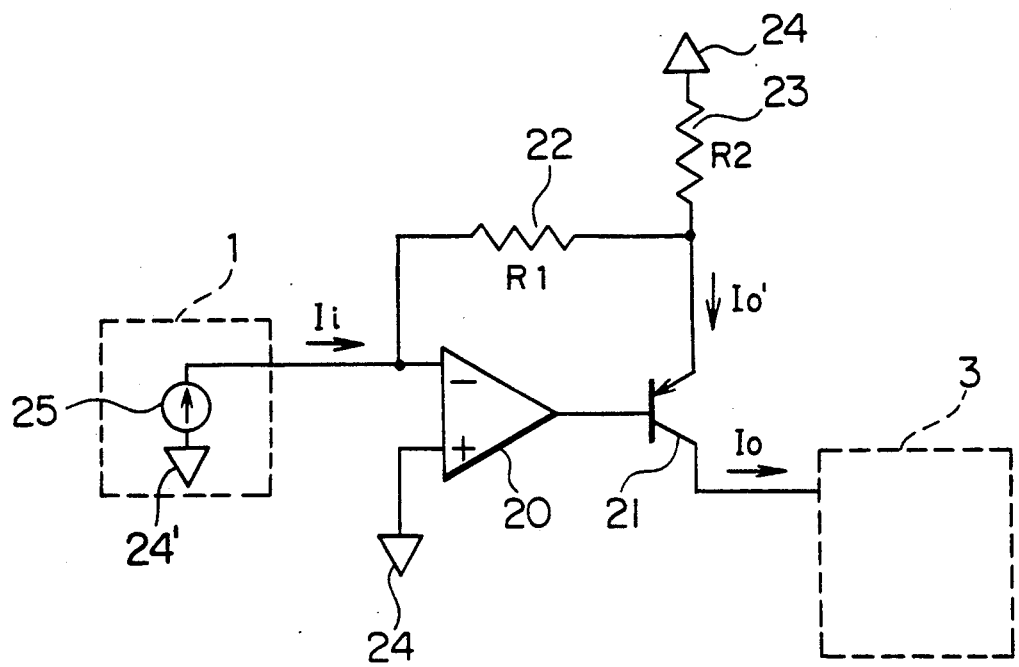
FIG. 2, FIG. 3 and FIG. 6 show configurations of a radiation detection circuit which is one component of the data acquisition system.

The current amplifiers 2-1 to 2-n are now explained with reference to FIG. 2. The current amplifier is made up of an operational amplifier 20, a feedback resistor 22 (R1), an amplifying resistor 23 (R2) and a PNP transistor 21. A non-inverting input terminal of the operational amplifier 20 is connected to a power supply voltage 24, and an inverting input terminal of the operational amplifier is connected to the X-ray detector 1 and to one terminal of the feedback resistor 22. The other terminal of the feedback resistor 22 is connected to the amplifying resistor 23 and the emitter of the PNP transistor 21. The other terminal of the amplifying resistor 23 is connected to the power supply voltage 24. The base of the PNP transistor 21 is connected to the output terminal of the operational amplifier 20. The output of the current amplifier is taken out of the collector of the PNP transistor 21.

The operation is now explained. The X-ray detector 1 is equivalently substituted by a current source 25 which supplies a signal current $I_i$. Whole detector current $I_i$ flows through the feedback resistor 22 to develop a voltage drop ($R1 \cdot I_i$) to the power supply voltage 24 at the node to which the feedback resistor 22 and the amplifying resistor 23 are connected. Depending on the voltage drop, a current ($R1 \cdot I_i/R2$) flows through the amplifying resistor 23. As a result, a current $I_0'$ flows into the emitter of the PNP transistor 21.

$$I_0' = [1 + (R1/R2)] \cdot I_i \tag{2}$$

A current amplifier output $I_0$ is given by $$I_0 = \alpha[1 + (R1/R2)] \cdot I_i \tag{3}$$

where $\alpha$ is a current gain factor of the PNP transistor 21 in the case of a common-base configuration.

In each of the integrators 3-1 to 3-n, the switch S1n is opened and the switch S2n is closed during the integration period to integrate the current amplifier output $I_0$ on the capacitor Cn. During the hold period, the switch S1 is closed and the switch S2 is opened to hold the charge. The multiplexer 4 sequentially opens and closes the switches S31 to S3n to transfer the charges held in the integrators 3-1 to 3-n to the charge/voltage converter 5. The charge/voltage converter S5 opens the switch 5 while one switch of the multiplexer 4 closes to transfer the charge integrated in one integrator to the hold capacitor $C_H$ for the voltage conversion. The charge of the hold capacitor $C_H$ is discharged by closing the switch S5 while all switches of the multiplexor 4 are open.

As described above, a relationship between the output current $I_i$ of the detector, the integration period t of the integrator and the output voltage V is $$V = (I_i \cdot t)/C$$

As the operating speed increases and the integration period is reduced to $t'$ (=t/m), the output voltage is given by $$\begin{aligned} V &= (I_0 \cdot t')/C \\ &= \{\alpha[1 + (R1/R2)] \cdot I_i \cdot (t/m)\}/C \\ &= (\alpha/m)[1 + (R1/R2)] \cdot (I_i \cdot t)/C \end{aligned} \tag{4}$$

where $I_0$ is the value of amplified $I_i$. If R1/R2 is selected such that $\alpha/m[1+(R1/R2)] = 1$, the output voltage $V_{max}$ is produced without changing the capacitance of the integration capacitor C.

With this arrangement, a sufficient dynamic range at the integrator output is secured, without reducing the capacitance of the integration capacitor, for the increase of the operating speed of the X-ray CT scanner and the increase of the charge feed-through due to the stray capacitance connected to the integration capacitor are avoided. As a result, high precision and highly linear data acquisition is attained.

Further, since the output terminal of the X-ray detector is kept at the constant bias level without regard to the output current, the linearity of the detector output is maintained. Thus, high speed operation, high precision and high linearity are attained with ease by merely adding the operational amplifier, two resistors and the transistor. For the solid-state detector described before, the photo-diode at the output stage and the current amplifier may be fabricated on one wafer to reduce mechanically and electrically induced noises which have been created in the prior art system by a cable connecting the photo-diode and the data acquisition system. The on-chip implementation is advantageous for the high precision as well as the cost reduction.

Figure 3:
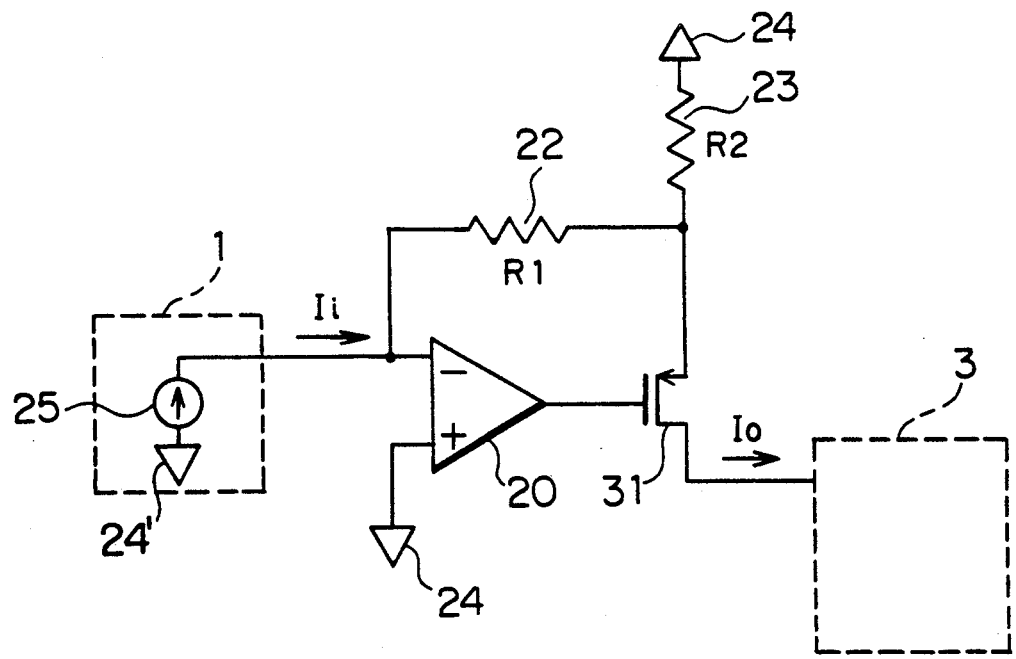

A second embodiment of the present invention is now explained with reference to FIG. 3. In the present embodiment, the PNP transistor of the current amplifier in the previous embodiment has been replaced by a P-channel FET transistor 31. As a result, the non-linear effect of the grounded base current amplification factor of the bipolar transistor caused by the operating current is avoided and further improvement of precision is attained.

Figure 4:
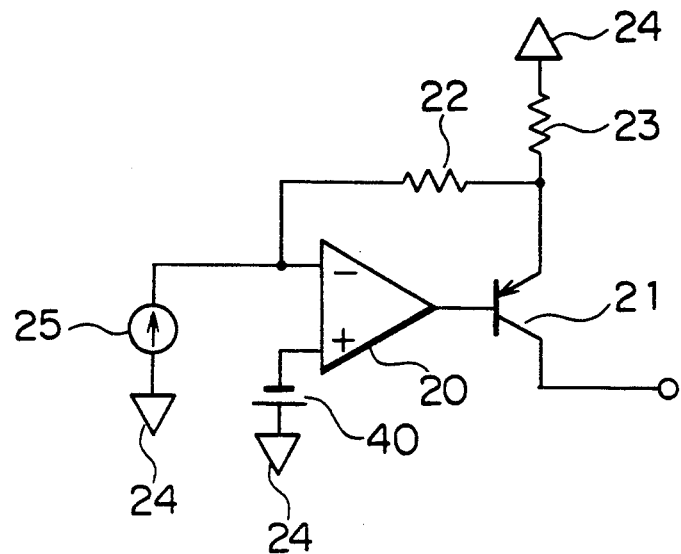
FIG. 4 and FIG. 5 show configurations of a current amplifier.
Figure 5:
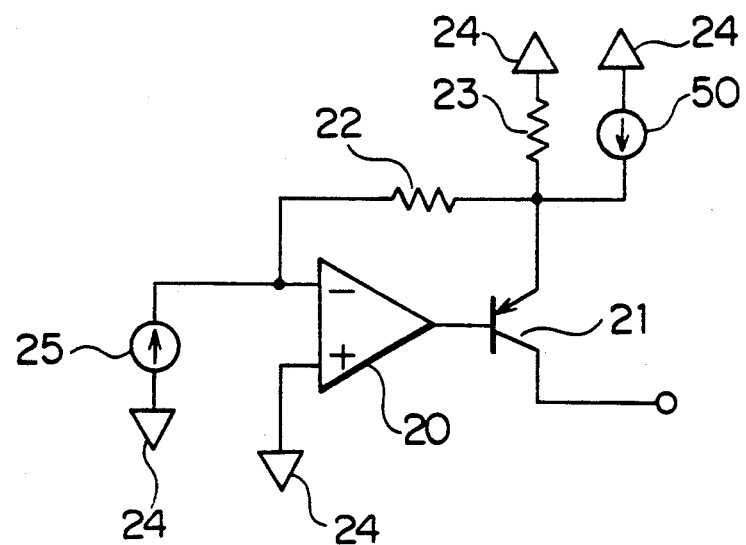

A third embodiment of the present invention is now explained with reference to FIGS. 4 and 5. In FIG. 4, a biasing voltage source 40 ($V_B$) is connected to the operational amplifier 20 of the current amplifier in the first embodiment, across the non-inverting input terminal and the power supply voltage 24, with the negative pole of the biasing voltage source 40 being connected to the operational amplifier. As a result, the potential at the node of the feedback resistor 22 and the amplifying resistor 23 drops by $V_B$ from the power supply voltage 24, and a current ($V_B/R2$) flows into the amplifying resistor 23 and the PNP transistor 21. In FIG. 5, a constant current source 50 supplied from the power supply voltage 24 is provided at the node of the feedback resistor 22 and the amplifying resistor 23 so that a constant current flows into the PNP transistor 21. This current serves as the DC biasing current for the PNP transistor. Accordingly, even if the output current of the detector is small, the operation is done at high transition $f_T$ of the transistor. This is advantageous for high speed operation.

Figure 6:
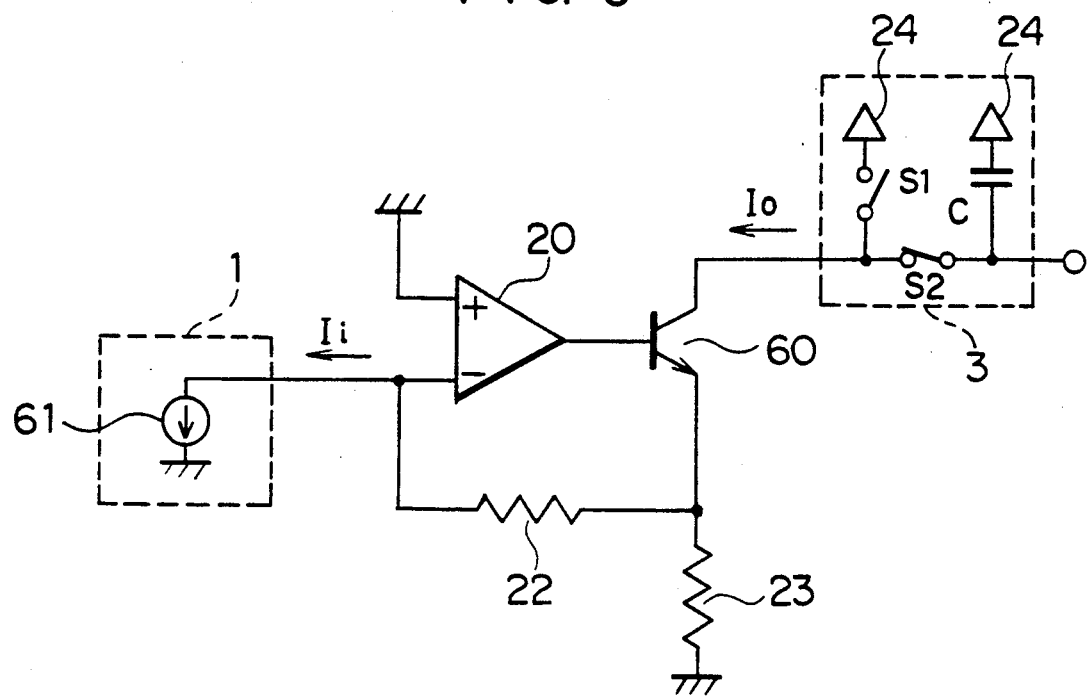

A fourth embodiment of the present invention is now explained with reference to FIG. 6. In the present embodiment, the X-ray detector 1 provides a sink type output current. The X-ray detector 1 is equivalent to a current source 61 which supplies a signal current Ii. In the present embodiment, the current amplifier is made up of an operational amplifier 20, a feedback resistor 22, an amplifying resistor 23 and a NPN transistor 60. The non-inverting input terminal of the operational amplifier 20 is grounded, and the inverting input terminal is connected to the detector and to one end of the feedback resistor 22. The other end of the feedback resistor 22 is connected to the amplifying resistor 23 and to the emitter of the NPN transistor 60. The output of the current amplifier is taken out of the collector of the NPN transistor 60 and is integrated by integrator 3. In this manner, the present invention is also applicable to the current sink type X-ray detector such as an Xe chamber.

Figure 7:
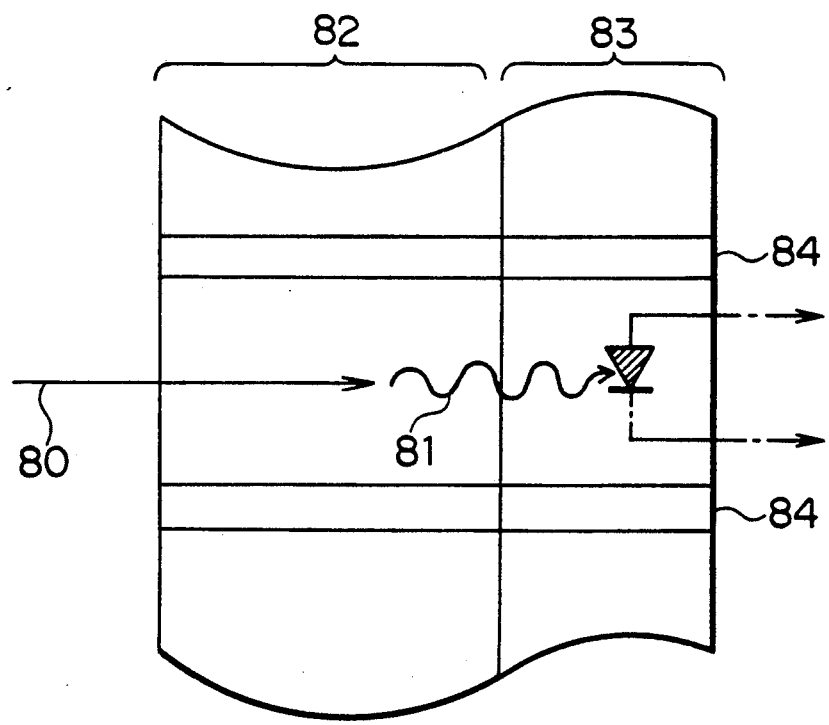
FIG. 7 shows a configuration of an X-ray detector.

The X-ray detector used in the first to fourth embodiments is now explained with reference to FIG. 7 which shows a solid-state detector. The solid-state detector is made up of a scintillator 82, for converting an X-ray 80 to a light ray 81, and a photo-diode 83, for photo-electrically converting the light 81 emitted by the scintillator 82. Where a plurality of solid-state detectors are arranged in proximity, separators 84 may be arranged as required in order to separate the adjacent detectors optically or X-ray-wise. The photo-diode 83 may be a crystalline or non-crystalline Si photo-diode. In this case, when the photo-diode is of PIN structure, the output leakage current is small and the S/N ratio is high.

The photo-diode may be made of other material such as GaAsP. When the data acquisition system shown in the first embodiment is coupled to the above X-ray detector, the output terminal of the X-ray detector is kept at the constant bias level without regard to the output current, and the linearity of the detector output is maintained over a wide X-ray input range. A similar effect is attained when other data acquisition systems are coupled.

Accordingly, by the configuration of the embodiment, a high performance radiation detector which can be used as a high precision X-ray CT scanner is attained.

Figure 8:
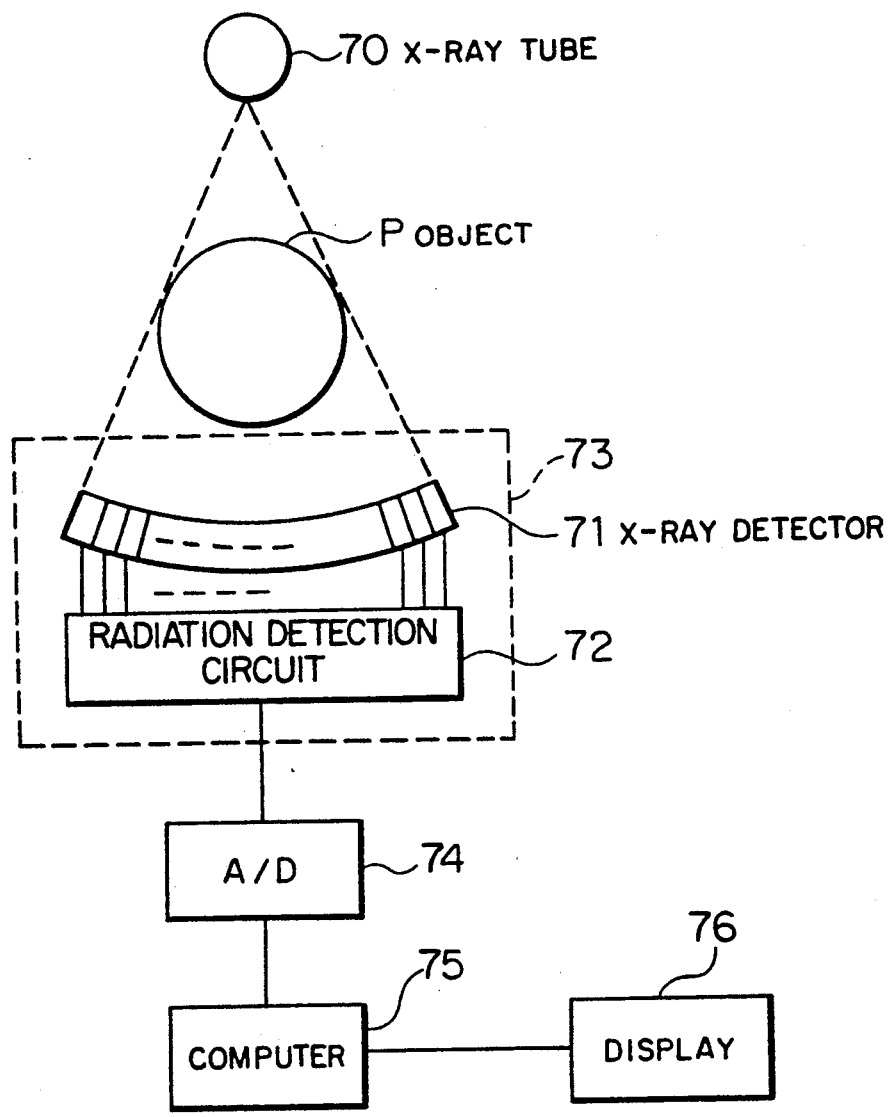
FIG. 8 shows a configuration of an X-ray CT scanner.
Figure 9:
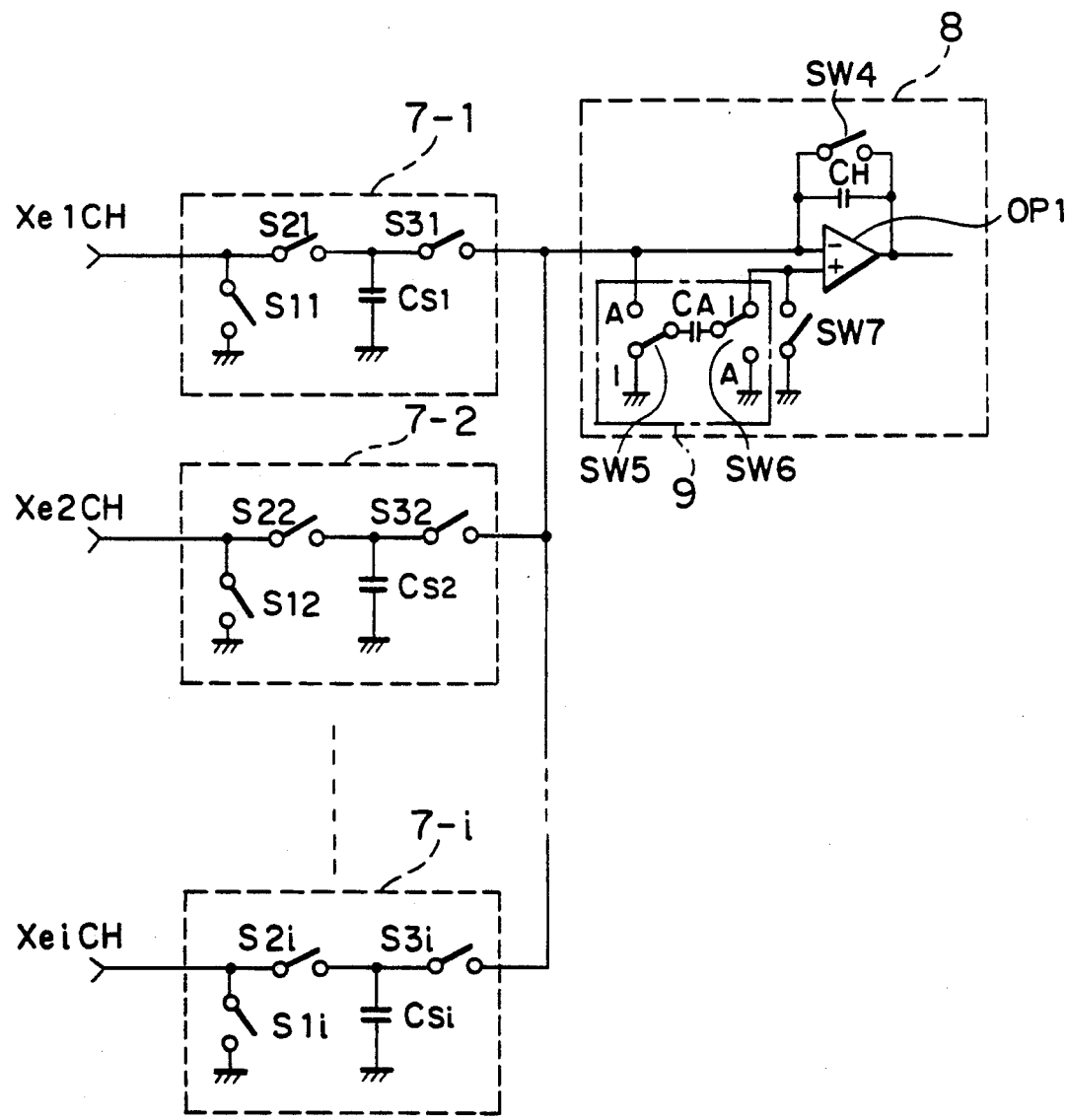
FIG. 9 shows a configuration of a prior art data acquisition system.

Finally, an X-ray CT scanner which utilizes the data acquisition system shown in the first embodiment is explained with reference to FIG. 8. In the present embodiment, the X-ray detectors 71 in the data acquisition system 73 shown in the first embodiment are arranged to face the object P on the opposite side from the X-ray tube 70 and are connected to radiation detection circuit 72. The output from the data acquisition system 73 is digitized by an A/D converter 74 and is analyzed by a computer 75 to display a reconstructed image on the display 76. In the present embodiment, as explained in connection with the first embodiment, the high precision and high linearity data acquisition system is used as the data acquisition system 73 so that the X-ray CT scanner can also reconstruct the image at high speed and high precision.

The above embodiments are mere illustrations of the present invention and the present invention should not be limited to those embodiments.

In accordance with the present invention, for the reduction of data acquisition time due to increase of the operating speed of the X-ray CT scanner, a current amplifier is added to the data acquisition system to increase the output signal current of the X-ray detector so that the output dynamic range of the integrator is secured without reducing the capacitance of the integration capacitor. Accordingly, the increase of charge feed-through due to the switching element in the integrator is avoided, and high precision is attained. The current amplifier is made up of the operational amplifier, feedback resistor, amplifying resistor and common base transistor, and the input terminal of the current amplifier is always virtually kept at the constant bias level, such as the power supply voltage or ground, so that the output terminal of the detector is fixedly biased and the dependency on the bias voltage of the photo-diode at the output terminal can be neglected, and linearity of the photo-diode is assured. Further, the problem of breakdown of the photo-diode which may occur when the output current of the detector increases is avoided.

We claim:

1. A radiation detection circuit comprising:
a radiation detector having a first terminal for connection to a power supply voltage and a second terminal for providing a current output in response to a radiation signal;
a current amplifier including (i) an operational amplifier having an inverting input terminal directly connected to the second terminal of said radiation detector to amplify the current output, a non-inverting input terminal for connection to the power support voltage, and an output terminal, and (ii) a PNP transistor having its base connected to the output terminal of said operational amplifier, a feedback resistor connected between the emitter of said PNP transistor and the inverting input terminal of said operational amplifier, an amplifying resistor for connection between the emitter of said PNP transistor and the power supply voltage, and means connecting the collector of said PNP transistor as the current amplifier output terminal; and
an integrator connected to the current amplifier output terminal for integrating the output of said current amplifier for a predetermined time period to produce charge information.

2. A radiation detection circuit according to claim 1 wherein said current amplifier further includes a biasing voltage source connected between the non-inverting input terminal of said operational amplifier and the power supply voltage, with the negative pole of said biasing voltage source connected to the non-inverting input terminal of said operational amplifier.

3. A radiation detection circuit according to claim 1 wherein said current amplifier further includes a biasing current source connected between the emitter of said PNP transistor and the power supply voltage for causing biasing current to flow into the emitter.

4. A radiation detection circuit according to claim 1 wherein said radiation detector comprises a scintillator and a silicon photo-diode.

5. A radiation detection circuit according to claim 4 wherein said scintillator, said silicon photo-diode and said current amplifier are fabricated on one silicon wafer.

6. A radiation detection circuit according to claim 1 wherein said integrator comprises an integration capacitor having a first terminal for connection to a reference voltage source and a second terminal, a first switch coupling the transistor collector with said integration capacitor second terminal and capable of assuming an open condition in which the transistor collector is isolated from said integration capacitor and a closed condition in which the transistor collector is connected to said integration capacitor for integration of the current amplifier output, and a second switch coupling the transistor collector with the reference voltage source and capable of assuming an open condition in which the transistor collector is isolated from the reference voltage source and a closed condition in which the transistor collector is connected to the reference voltage source.

7. A radiation detection circuit comprising:
a radiation detector having a first terminal for connection to a power supply voltage and a second terminal for providing a current output in response to a radiation signal;
a current amplifier including (i) an operational amplifier having an inverting input terminal directly connected to the second terminal of said radiation detector to amplify the current output, a non-inverting input terminal for connection to the power support voltage, and an output terminal; and (ii) a P-channel FET transistor having its gate connected to the output terminal of said operational amplifier, a feedback resistor connected between the source of said P-channel FET transistor and the inverting input terminal of said operational amplifier, an amplifying resistor for connection between the source of said P-channel FET transistor and the power supply voltage, and means connecting the drain of said P-channel FET transistor as the current amplifier output terminal; and
an integrator connected to the current amplifier output terminal for integrating the output of said current amplifier for a predetermined time period to produce charge information.

8. A radiation detection circuit according to claim 7 wherein said current amplifier further includes a biasing current source connected between the source of said P-channel FET transistor and the power supply voltage for causing biasing current to flow into the FET source.

9. A radiation detector circuit according to claim 7 wherein said integrator comprises an integration capacitor having a first terminal for connection to a reference voltage source and a second terminal, a first switch coupling the P-channel FET transistor drain with said integration capacitor second terminal and capable of assuming an open condition in which the P-channel FET transistor drain is isolated from said integration capacitor and a closed condition in which the P-channel FET transistor drain is connected to said integration capacitor for integration of the current amplifier output, and a second switch coupling the P-channel FET transistor drain with the reference voltage source and capable of assuming an open condition in which the P-channel FET transistor drain is isolated from the reference voltage source and a closed condition in which the P-channel FET transistor drain is connected to the reference voltage source.

10. A radiation detection circuit according to claim 7 wherein said current amplifier further includes a biasing voltage source connected between the non-inverting input terminal of said operational amplifier and the power supply voltage, with the negative pole of said biasing voltage source connected to the non-inverting input terminal of said operational amplifier.

11. A radiation detection circuit according to claim 7 wherein said radiation detector comprises a scintillator and a silicon photo-diode.

12. A radiation detection circuit according to claim 11 wherein said scintillator, said silicon photodiode and said current amplifier are fabricated on one silicon wafer.

13. A data acquisition system comprising:
a plurality of radiation detectors, each radiation detector having a first terminal for connection to a power supply voltage and a second terminal for providing a current output in response to a radiation signal;
a plurality of current amplifiers for amplifying output currents of said plurality of radiation detectors, respectively, each current amplifier including an operational amplifier having an inverting input terminal directly connected to the second terminal of a respective radiation detector to amplify the current output therefrom, a non-inverting input terminal for connection to a power supply voltage, an output terminal, a P-channel FET transistor having its gate connected to the output terminal of the operational amplifier, a feedback resistor connected between the source of said P-channel FET transistor and the inverting input terminal of the operational amplifier, an amplifying resistor for connection between the source of said P-channel FET transistor and the power supply voltage, and means connecting the drain of said P-channel FET transistor as the output terminal of the respective current amplifier;

a plurality of integrators connected to output terminals of the respective current amplifiers for repeatedly integrating the output currents of the respective current amplifiers for a predetermined time period to produce charge information; and means for sequentially selecting the charge information of the integrators to sequentially convert the charge information to voltages to produce serial data representing the outputs of the radiation detectors.

14. A data acquisition system comprising:

a plurality of radiation detectors, each radiation detector having a first terminal for connection to a power supply voltage and a second terminal for providing a current output in response to a radiation signal;

a plurality of current amplifiers for amplifying output currents of said plurality of radiation detectors, respectively, each current amplifier including an operational amplifier having an inverting input terminal directly connected to the second terminal of a respective radiation detector to amplify the current output therefrom, a non-inverting input terminal for connection to a power supply voltage, an output terminal, a PNP transistor having its base connected to the output terminal of the operational amplifier, a feedback resistor connected between the emitter of the PNP transistor and the inverting input terminal of the operational amplifier, an amplifying resistor for connection between the emitter of the PNP transistor and the power supply voltage, and means connecting the collector of the PNP transistor as the output terminal of the respective current amplifier;

a plurality of integrators connected to output terminals of the respective current amplifiers for repeatedly integrating the output currents of the respective current amplifiers for a predetermined time period to produce charge information; and means for sequentially selecting the charge information of the integrators to sequentially convert the charge information to voltages to produce serial data representing the outputs of the radiation detectors.

* * * * *